US008475918B2

(12) United States Patent
DiGiovanni et al.

(10) Patent No.: US 8,475,918 B2
(45) Date of Patent: Jul. 2, 2013

(54) POLYCRYSTALLINE TABLES HAVING POLYCRYSTALLINE MICROSTRUCTURES AND CUTTING ELEMENTS INCLUDING POLYCRYSTALLINE TABLES

(75) Inventors: Anthony A. DiGiovanni, Houston, TX (US); Michael L. Fish, Ennis (IE)

(73) Assignees: Baker Hughes Incorporated, Houston, TX (US); Element Six Limited, Co. Claire (IE)

( * ) Notice: Subject to any disclaimer, the term of this patent is extended or adjusted under 35 U.S.C. 154(b) by 199 days.

(21) Appl. No.: 12/916,201

(22) Filed: Oct. 29, 2010

(65) Prior Publication Data
US 2011/0132666 A1 Jun. 9, 2011

Related U.S. Application Data

(63) Continuation-in-part of application No. 12/568,966, filed on Sep. 29, 2009.

(51) Int. Cl.
*B32B 9/00* (2006.01)

(52) U.S. Cl.
USPC .......................................... 428/325; 428/408

(58) Field of Classification Search
USPC ................................................. 428/325, 408
See application file for complete search history.

(56) References Cited

U.S. PATENT DOCUMENTS

| 4,311,490 A | 1/1982 | Bovenkerk et al. |
|---|---|---|
| 4,403,015 A | 9/1983 | Nakai et al. |
| 4,729,440 A * | 3/1988 | Hall .............................. 51/293 |
| 4,802,895 A | 2/1989 | Burnand et al. |
| 4,940,180 A | 7/1990 | Martell |
| 5,217,081 A | 6/1993 | Waldenstrom et al. |
| 5,248,317 A | 9/1993 | Tank et al. |
| 5,264,283 A | 11/1993 | Waldenstrom et al. |
| 5,370,195 A * | 12/1994 | Keshavan et al. ............ 175/428 |
| 5,441,817 A | 8/1995 | Rai |
| 5,496,638 A | 3/1996 | Waldenstrom et al. |
| 5,498,480 A | 3/1996 | Tank et al. |
| 5,624,068 A | 4/1997 | Waldenstrom et al. |
| 5,954,147 A | 9/1999 | Overstreet et al. |
| 6,342,301 B1 | 1/2002 | Yoshida et al. |
| 6,562,462 B2 | 5/2003 | Griffin et al. |
| 6,585,064 B2 | 7/2003 | Griffin et al. |

(Continued)

FOREIGN PATENT DOCUMENTS

EP 0517510 8/1995

OTHER PUBLICATIONS

International Search Report for International Application No. PCT/US2010/049671 mailed Apr. 28, 2011, 3 pages.

(Continued)

*Primary Examiner* — Archene Turner
(74) *Attorney, Agent, or Firm* — TraskBritt

(57) ABSTRACT

Cutting elements comprise a substrate and an unleached polycrystalline table attached on an end of the substrate. The polycrystalline table comprises a plurality of continuously inter-bonded grains of a superhard material and a quantity of catalyst material disposed in interstitial spaces between grains of the plurality of continuously inter-bonded grains of a superhard material. A mean grain size of the plurality of continuously inter-bonded grains is at least substantially uniform throughout the polycrystalline table and the quantity of catalyst material varies across the polycrystalline table in a direction parallel to a central axis of the polycrystalline table.

24 Claims, 10 Drawing Sheets

U.S. PATENT DOCUMENTS

| | | |
|---|---|---|
| 6,589,640 B2 | 7/2003 | Griffin et al. |
| 6,592,985 B2 | 7/2003 | Griffin et al. |
| 6,601,662 B2 | 8/2003 | Matthias et al. |
| 6,739,214 B2 | 5/2004 | Griffin et al. |
| 6,749,033 B2 | 6/2004 | Griffin et al. |
| 6,797,326 B2 | 9/2004 | Griffin et al. |
| 6,861,098 B2 | 3/2005 | Griffin et al. |
| 6,861,137 B2 | 3/2005 | Griffin et al. |
| 6,878,447 B2 | 4/2005 | Griffin et al. |
| 7,473,287 B2 | 1/2009 | Belnap et al. |
| 7,493,973 B2 | 2/2009 | Keshavan et al. |
| 7,608,333 B2 | 10/2009 | Eyre |
| 7,757,793 B2 | 7/2010 | Voronin et al. |
| 7,942,219 B2 | 5/2011 | Keshavan et al. |
| 8,061,454 B2 | 11/2011 | Voronin et al. |
| 2005/0115744 A1 | 6/2005 | Griffin et al. |
| 2005/0139397 A1 | 6/2005 | Achilles et al. |
| 2005/0263328 A1 | 12/2005 | Middlemiss |
| 2006/0060390 A1 | 3/2006 | Eyre |
| 2006/0060391 A1 | 3/2006 | Eyre et al. |
| 2006/0060392 A1 | 3/2006 | Eyre |
| 2006/0162969 A1 | 7/2006 | Belnap et al. |
| 2007/0039762 A1 | 2/2007 | Achilles |
| 2007/0079994 A1 | 4/2007 | Middlemiss |
| 2007/0144790 A1 | 6/2007 | Fang et al. |
| 2007/0181348 A1 | 8/2007 | Lancaster et al. |
| 2008/0073126 A1 | 3/2008 | Shen et al. |
| 2008/0179109 A1 | 7/2008 | Belnap et al. |
| 2008/0230280 A1* | 9/2008 | Keshavan et al. ............ 175/434 |
| 2009/0114454 A1 | 5/2009 | Belnap et al. |
| 2009/0152017 A1 | 6/2009 | Shen et al. |

OTHER PUBLICATIONS

International Written Opinion for International Application No. PCT/US2010/049671 mailed Apr. 28, 2011, 3 pages.

* cited by examiner

POLYCRYSTALLINE TABLES HAVING POLYCRYSTALLINE MICROSTRUCTURES AND CUTTING ELEMENTS INCLUDING POLYCRYSTALLINE TABLES

CROSS-REFERENCE TO RELATED APPLICATION

This application is a continuation-in-part of U.S. patent application Ser. No. 12/568,966, filed Sep. 29, 2009, now U.S. Pat. No. 8,263,801, issued Sep. 11, 2012, the disclosure of which is hereby incorporated herein by reference in its entirety.

TECHNICAL FIELD

Embodiments of the present disclosure relate generally to polycrystalline microstructures and, more specifically, to polycrystalline microstructures comprising non-uniform concentrations of catalyst disposed in interstitial spaces between inter-bonded grains of the polycrystalline material.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit.

The cutting elements used in such earth-boring tools often include polycrystalline diamond compact (often referred to as "PDC") cutting elements, also termed "cutters," which are cutting elements that include a polycrystalline diamond ("PCD") material, which may be characterized as a superhard material. Such polycrystalline diamond materials are formed by sintering and bonding together relatively small diamond grains or crystals, conventionally termed "grit," under conditions of high temperature and high pressure in the presence of a catalyst (such as, for example, cobalt, iron, nickel, or alloys and mixtures thereof) to form a layer of polycrystalline diamond material, also called a diamond table. The diamond grit may comprise synthetic or natural diamond grains, or a combination of synthetic and natural diamond grains. These processes are often referred to as high temperature/high pressure (or "HTHP") processes. The cutting element substrate may comprise a cermet material (i.e., a ceramic-metal composite material) such as, for example, cobalt-cemented tungsten carbide. In some instances, the polycrystalline diamond table may be foamed on the cutting element, for example, during the HTHP sintering process. In such instances, cobalt (or other catalyst material) in the cutting element substrate may be swept into the diamond grains or crystals during sintering and serve as a catalyst material for forming a diamond table from the diamond grains or crystals. Powdered catalyst material may also be mixed with the diamond grains or crystals prior to sintering the grains or crystals together in an HTHP process. In other methods, however, the polycrystalline diamond table may be formed separately from the cutting element substrate and subsequently attached thereto.

Upon formation of a diamond table using an HTHP process, catalyst material may remain in interstitial spaces between the grains or crystals of diamond in the resulting polycrystalline diamond table. The presence of the catalyst material in the diamond table may contribute to thermal damage in the diamond table when the cutting element is heated during use due to friction at the contact point between the cutting element and the formation. Polycrystalline diamond cutting elements in which the catalyst material remains in the diamond table are generally thermally stable up to a temperature of about seven hundred fifty degrees Celsius (750° C.), although internal stress within the polycrystalline diamond table may begin to develop at temperatures exceeding about three hundred fifty degrees Celsius (350° C.). This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about seven hundred fifty degrees Celsius (750° C.) and above, stresses within the diamond table may increase significantly due to differences in the coefficients of thermal expansion of the diamond material and the catalyst material within the diamond table itself. For example, cobalt thermally expands significantly faster than diamond, which may cause cracks to form and propagate within the diamond table, eventually leading to deterioration of the diamond table and ineffectiveness of the cutting element.

Furthermore, at temperatures at or above about seven hundred fifty degrees Celsius (750° C.), some of the diamond crystals within the diamond table may react with the catalyst material causing the diamond crystals to undergo a chemical breakdown or conversion to another allotrope of carbon. For example, the diamond crystals may graphitize at the diamond crystal boundaries, which may substantially weaken the diamond table. Also, at extremely high temperatures, in addition to graphite, some of the diamond crystals may be converted to carbon monoxide and carbon dioxide.

To reduce the problems associated with different rates of thermal expansion in polycrystalline diamond cutting elements, so-called "thermally stable" polycrystalline diamond (TSD) tables have been developed. A thermally stable polycrystalline diamond table may be formed by leaching the catalyst material (e.g., cobalt) out from interstitial spaces between the diamond grains in the diamond table using, for example, an acid or combination of acids (e.g., aqua regia). In addition to leaching, some cutting elements may use particles of different average particle sizes to reduce the volume of interstitial spaces between grains of the diamond table. As the volume of interstitial spaces between the grains decreases due to the increased packing density of particles having different average grain sizes, a smaller volume of catalyst material may be present in the diamond table. All of the catalyst material may be removed from the diamond table, or only a portion may be removed. Thermally stable polycrystalline diamond tables in which substantially all catalyst material has been leached from the diamond table have been reported to be thermally stable up to temperatures of about twelve thousand degrees Celsius (1,200° C.). It has also been reported, however, that such fully leached diamond tables are relatively more brittle and vulnerable to shear, compressive, and tensile stresses than are non-leached diamond tables. In addition, it is difficult to secure a completely leached diamond table to a supporting substrate. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which only a portion of the catalyst material has been leached from the diamond table. For example, it is known to leach catalyst material from the cutting face, from the side of the diamond table, or both, to a desired depth within the diamond table, but without leaching all of the catalyst material out from the diamond table.

BRIEF SUMMARY

In some embodiments, the present disclosure includes cutting elements comprising a substrate and an unleached polycrystalline table attached on an end of the substrate. The polycrystalline table comprises a plurality of continuously inter-bonded grains of a superhard material and a quantity of catalyst material disposed in interstitial spaces between grains of the plurality of continuously inter-bonded grains of a superhard material. A mean grain size of the plurality of continuously inter-bonded grains is at least substantially uniform throughout the polycrystalline table and the quantity of catalyst material varies across the polycrystalline table in a direction parallel to a central axis of the polycrystalline table.

In further embodiments, the present disclosure includes cutting elements comprising a substrate and an unleached polycrystalline table attached on an end of the substrate. The polycrystalline table comprises a plurality of continuously inter-bonded grains of a superhard material and a quantity of catalyst material disposed in interstitial spaces between grains of the plurality of continuously inter-bonded grains. A mean volume of the interstitial spaces between grains of the plurality of continuously inter-bonded grains is at least substantially uniform throughout the polycrystalline table and the quantity of catalyst material varies across the polycrystalline table in a direction parallel to a central axis of the polycrystalline table.

In additional embodiments, the present disclosure includes cutting elements comprising a substrate and an unleached polycrystalline table attached on an end of the substrate. The polycrystalline table comprises a first layer at an end of the unleached polycrystalline table opposing the substrate, a second layer comprising a second plurality of inter-bonded grains of a superhard material, and a third layer interposed between the second layer and the substrate. The first layer comprises a first plurality of inter-bonded grains of a superhard material and a first volume percentage of catalyst material disposed in interstitial spaces between inter-bonded grains of the first plurality. The second plurality of inter-bonded grains is continuously inter-bonded with the first plurality of inter-bonded grains, and a second volume percentage of catalyst material is disposed in interstitial spaces between grains of the second plurality. The second volume percentage of catalyst material is greater than the first volume percentage of catalyst material. The third layer comprises a third plurality of inter-bonded grains of a superhard material, the third plurality of inter-bonded grains being continuously inter-bonded with the second plurality of inter-bonded grains. A third volume percentage of catalyst material is disposed in interstitial spaces between grains of the third plurality, the third volume percentage of catalyst material being greater than the second volume percentage of catalyst material. Each of the first, second, and third layers extends in a direction transverse to a central axis of the polycrystalline table.

In further embodiments, the present disclosure includes cutting elements comprising a substrate and an unleached polycrystalline table comprising a catalyst material disposed in interstitial spaces between continuously inter-bonded grains of a superhard material and attached on an end of the substrate. The polycrystalline table further comprises a cutting end comprising a first volume percentage of catalyst material, a substrate attachment end opposing the cutting end and comprising a second volume percentage of catalyst material, the second volume percentage of catalyst material being greater than the first volume percentage of catalyst material, and an intermediate region bonded to and interposed between the cutting end and the substrate attachment end and comprising a third volume percentage of catalyst material. The third volume percentage of catalyst material is smaller than the second volume percentage of catalyst material and greater than the first volume percentage of catalyst material.

In additional embodiments, the present disclosure includes intermediate structures during formation of cutting elements comprising a substrate, a polycrystalline table attached to an end of the substrate, a sacrificial layer of polycrystalline material bonded to the polycrystalline table at an end of the polycrystalline table opposing the substrate, and a sink disposed on an end of the sacrificial layer at an end of the sacrificial layer opposing the polycrystalline table. The polycrystalline table comprises a plurality of inter-bonded grains of a superhard material and a catalyst material disposed in interstitial spaces between grains of the plurality of inter-bonded grains of a superhard material. The sacrificial layer of polycrystalline material comprises a plurality of inter-bonded grains of a superhard material and a catalyst material disposed in interstitial spaces between grains of the plurality of inter-bonded grains of a superhard material. The sink comprises a material that reacts with the catalyst material at least at the reactivity level of a diamond powder.

In further embodiments, the present disclosure includes polycrystalline tables formed by processes comprising providing a first layer comprising superhard particles having a first mean particle size on a layer of catalyst material; providing a second layer comprising superhard particles having a second average particle size on the first layer, the second mean particle size being larger than the first mean particle size; providing a third layer comprising a reactive material on the second layer, the reactive material being reactive with the catalyst material; pressing and heating the first, second, and third layers; bonding particles of at least the first layer of superhard particles to form a polycrystalline material; and removing the second and third layers.

BRIEF DESCRIPTION OF THE SEVERAL VIEWS OF THE DRAWINGS

While the specification concludes with claims particularly pointing out and distinctly claiming that which is regarded as the present invention, various features and advantages of embodiments of this invention may be more readily ascertained from the following description of embodiments of the invention when read in conjunction with the accompanying drawings, in which:

DETAILED DESCRIPTION

Some of the illustrations presented herein are not meant to be actual views of any particular process, cutting element, polycrystalline table, or material microstructure, but are merely idealized representations that are employed to describe the embodiments of the present disclosure. Additionally, elements common between figures may retain the same or similar numerical designation.

As used herein, the term "polycrystalline material" means and includes any structure comprising a plurality of grains (i.e., crystals) of the material that are bonded directly together by inter-granular bonds. The crystal structures of the individual grains of the material may be randomly oriented in space within the polycrystalline material.

As used herein, the term "inter-granular bond" means and includes any direct atomic bond (e.g., covalent, metallic, etc.) between atoms in adjacent grains of superabrasive material.

As used herein, the terms "catalyst" and "catalyst material" refer to any material that is capable of substantially catalyzing the formation of inter-granular bonds between grains of superabrasive, diamond material during an HTHP process. For example, catalyst materials for diamond include cobalt, iron, nickel, other elements from Group VIIIA of the Periodic Table of the Elements, and alloys thereof.

Figure 1:
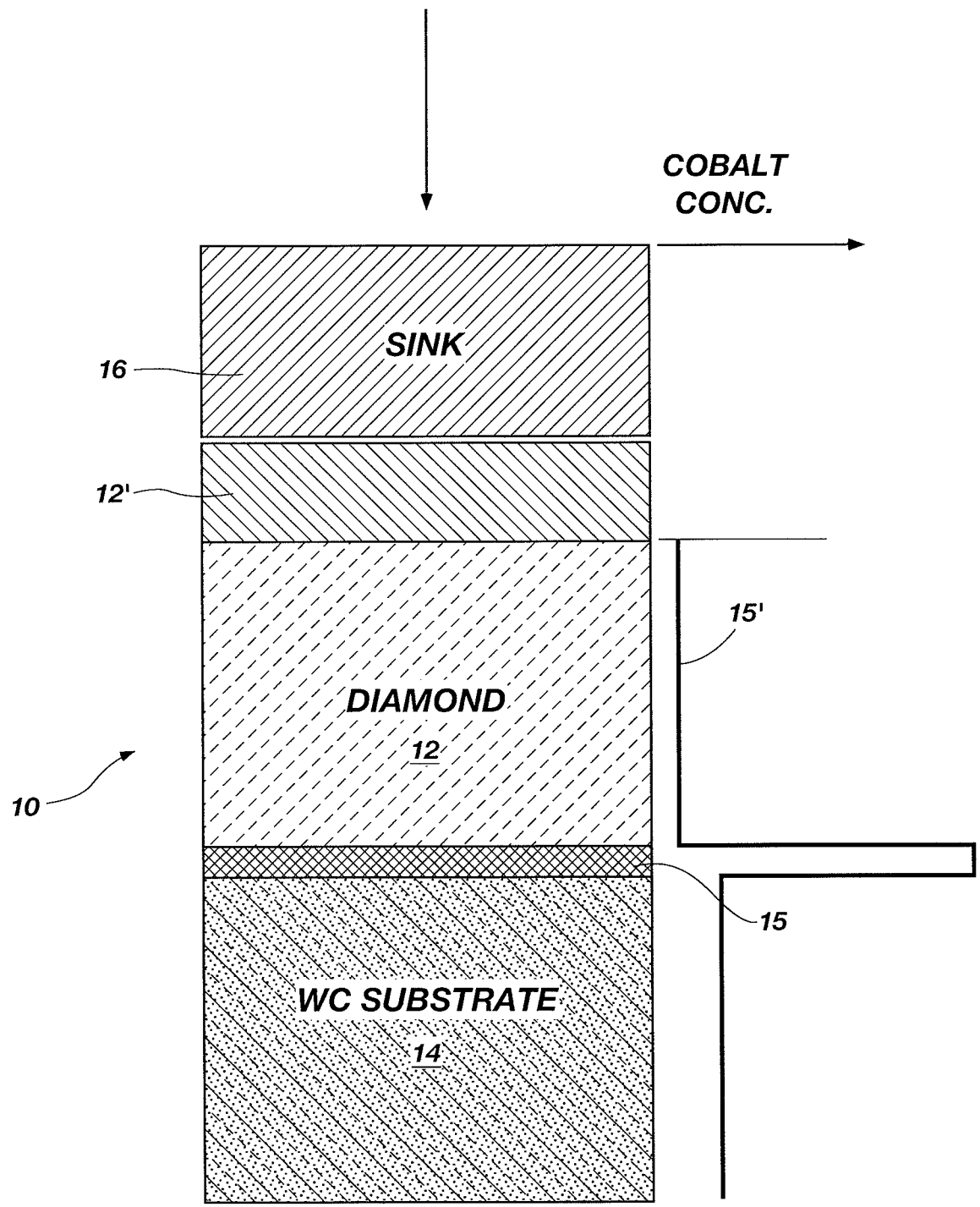
FIG. 1 is a drawing of a PDC compact before pressing.

Illustrated in FIG. 1 is a representation of a compact 10 to be pressed under high pressure and high temperature (HPHT) to form a polycrystalline diamond compact (PDC) for use as a cutter on a rotary drag bit. The compact 10 includes a substrate 14, a catalyst layer 15, a first layer of diamond powder 12, a sacrificial layer or second layer 12' of diamond powder, and a sink 16. The compact 10 includes two layers of diamond powder, a first layer of diamond powder 12 typically having a mean particle size in the range of about 2 microns to about 50 microns and a second more coarse sacrificial layer 12' of diamond powder having a particle size in the range of about 100 microns to about 500 microns or multi-modal particle size distributions thereof for forming a diamond table for cutting. The catalyst layer 15 may comprise a layer of powdered solvent catalyst, such as cobalt. Although the catalyst layer 15 is illustrated as a separate layer, catalyst powder may be mixed within primarily the diamond powder 12, if desired. Alternatively, the catalyst layer 15 may comprise a solid disc of catalyst. Catalyst material of the catalyst layer 15 acts as a catalyst for forming the diamond table and for attaching the polycrystalline diamond table to a substrate 14. The substrate 14 typically comprises a cermet material (i.e., a ceramic-metal composite material) such as, for example, cobalt-cemented tungsten carbide for forming a backup substrate, after pressing. The sink 16 acts as a getter that can react favorably with or adsorb any catalyst, or any suitable metal catalyst, in the diamond powder 12 and in the sacrificial layer 12' of diamond powder to reduce the concentration of the catalyst, or other suitable metal catalyst, in the diamond powder 12, which may be swept into the diamond grains of diamond powder 12 from either the substrate 14, or the catalyst layer 15, during sintering. During sintering, each of substrate 14 and the catalyst layer 15 serves as catalyst material for forming the inter-granular diamond-to-diamond bonds, and the resulting diamond table, from the diamond grains. In other methods, metal catalyst material may additionally be mixed with the diamond grains prior to sintering in a HTHP process. Upon formation of a diamond table 12 using a HTHP process, catalyst material may remain after pressing and cooling to form a diamond microstructure for the diamond table 12 of the compact 10. The sacrificial layer 12' may comprise coarse diamond, carbide, graphite, ceramic, metal, or any suitable mixtures thereof as well as any suitable materials that promote fracturing of the sacrificial layer 12' and allow the migration of catalyst therethrough. The sink 16 may be any suitable material such as fine diamond, graphite, metals, or metal alloys which will react at or, preferably, above the reactivity level of the diamond powder. By placing the sink 16 over the diamond powder 12 and sacrificial layer 12', the sink 16 causes a solvent gradient to occur across the diamond powder 12 and sacrificial layer 12' for the solvent catalyst in the diamond powder 12 and sacrificial layer 12' to migrate to the sink 16 during high pressure and high temperature formation of the compact 10. The sacrificial layer 12' of diamond powder acts as a sacrificial layer to be removed after the High Pressure High Temperature (HPHT) portion of the process by any suitable means, such as direct separation of the sacrificial layer 12' of diamond powder from diamond layer 12 or cutting, grinding, or lapping, etc. The sacrificial layer 12' of diamond powder should not remain on the compact 10, although in some instances it may be retained. While coarse diamond powder for the sacrificial layer 12' is preferred to be used, any diamond powder may be used and may include a minimally reacting material therein, if so desired. The sacrificial layer 12' of coarse diamond powder may be in powder foam, mixed with a suitable metal, layered, or in any combination thereof The sacrificial layer 12' of diamond powder should react minimally with the layer of diamond powder 12 allowing the catalyst to pass freely through the sacrificial layer 12' of diamond powder with minimal reactivity therewith and should be easily removable from the layer of diamond powder layer 12. In certain instances, the sacrificial layer 12' of diamond powder may not be used and only the sink 16 used, if the sink 16 may be easily separated from the layer of diamond powder layer 12 and the sink 16 retains the activity thereof without the sacrificial layer 12' of diamond powder after high temperature and high pressure formation of the compact 10.

Figure 1A:
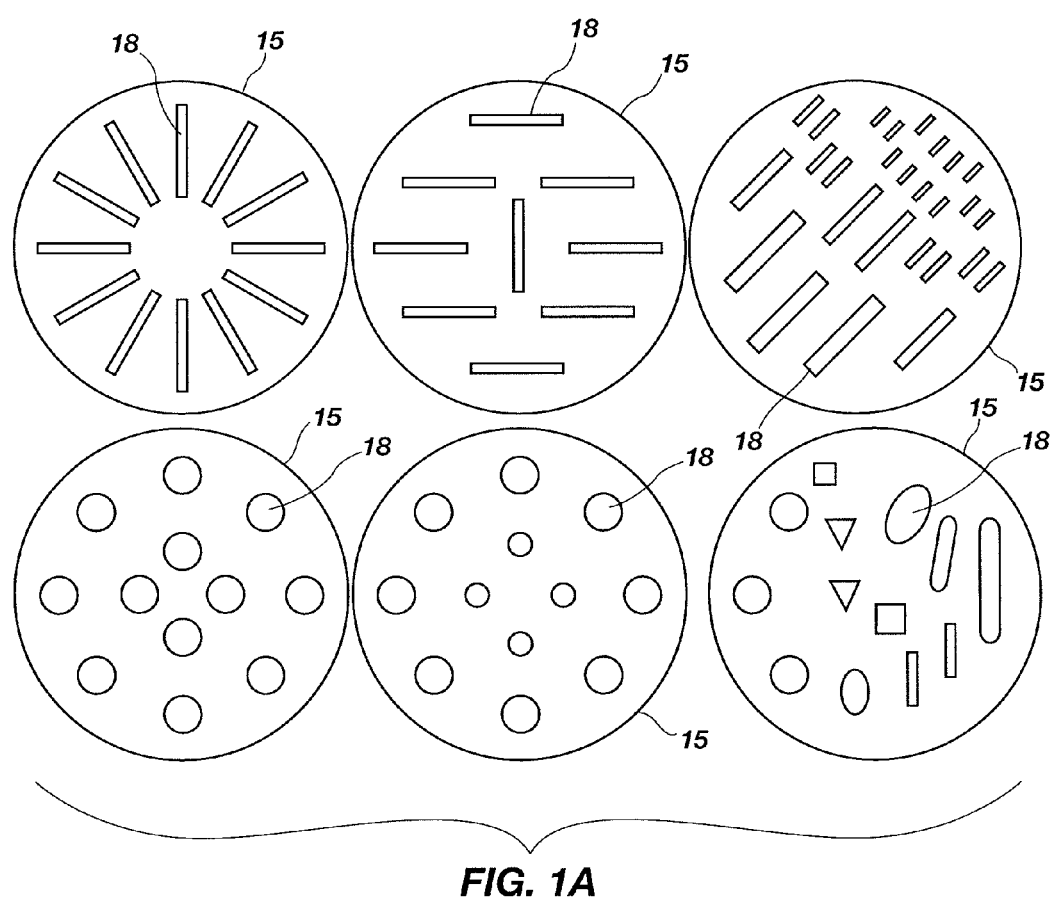
FIG. 1A is a drawing of various patterns for interfacial barrier designs for the control of catalyst migration to a diamond powder and sink.

As illustrated in FIG. 1A, if desired, the catalyst layer 15 may consist of a solid metal disc or metal alloy disc having reduced catalytic activity, such as a nickel disc. The disc includes a plurality of apertures 18 therein to control the migration of catalyst contained within the substrate 14 into the layer of diamond powder 12 and sacrificial layer 12' to the sink 16. The thickness of the catalyst layer 15, may be any thickness in the range of approximately 1 micron to approximately 100 microns. The shape of the apertures 18 may be any desired shape, such as circular, square, rectangular, oval, ellipsoid, triangular, or any desired combinations thereof in any desired patterns thereof The length and width of the apertures 18 may be any desired diameter thereof or length and width thereof convenient for the size of the compact 10. The apertures 18 may have any desired pattern, such as symmetrical, asymmetrical, any desired combinations thereof, etc.

Referring back to FIG. 1, the initial concentration of catalyst material in the catalyst layer 15 below diamond powder 12 or in the diamond powder 12 is illustrated by the graphic representation 15' on the right side FIG. 1 showing that the diamond powder 12 and sacrificial layer 12' of diamond powder each have some concentration of catalyst material therein while the highest concentration of catalyst material is in the catalyst layer 15 at or near the interface of the layer of diamond powder 12. If desired, the wettability of the diamond powder 12 and sacrificial layer 12' can be enhanced with a graphite coating or any other agent to allow the catalyst material to migrate more easily to the sink 16 from the diamond powder 12 and sacrificial layer 12'.

Figure 2:
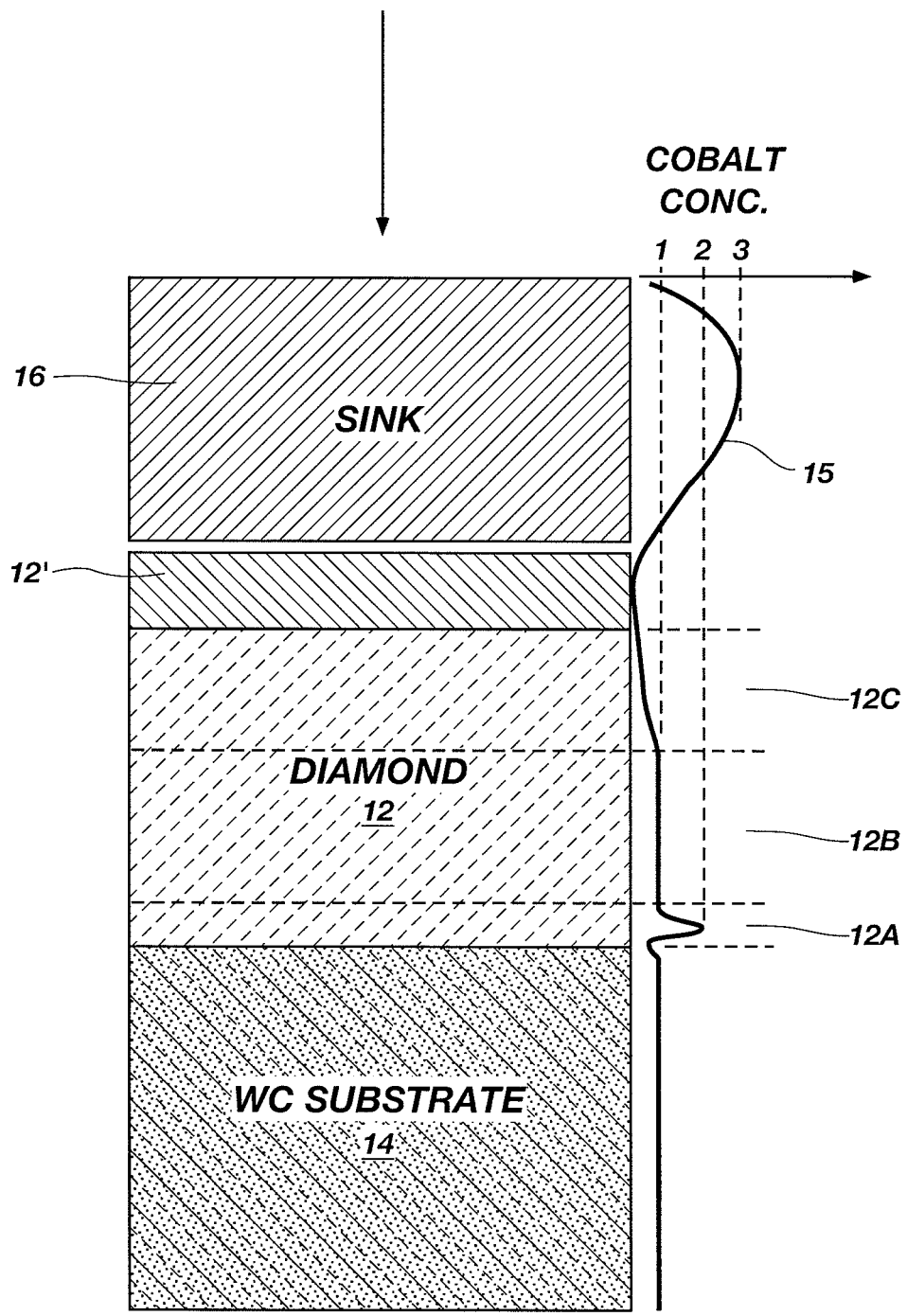
FIG. 2 is a drawing of the PDC of FIG. 1 after pressing.

Illustrated in FIG. 2 is a representation of a compact 10 of FIG. 1, or with the catalyst layer 15 of FIG. 1A, after high pressure and high temperature pressing of the compact 10. As illustrated on the right side of the compact 10, during high pressure and high temperature pressing of the compact 10, the affinity of the sink material 16 has caused catalyst material to migrate to the sink 16. As illustrated, the sink 16 has the highest concentration of the catalyst material, after high pressure and high temperature pressing of the compact 10. As illustrated, the polycrystalline diamond table 12 formed from the diamond powder 12 and sacrificial layer 12' of diamond powder includes, at or near the WC substrate 14, a first level 12A of concentration of catalyst material having a level of concentration of catalyst of about two times or more of the level of concentration of catalyst in the WC substrate 14, a second level 12B of concentration of catalyst having a level of concentration of about the same level of concentration of catalyst as in the WC substrate 14, and a third level of concentration of catalyst having a level 12C of concentration of catalyst decreasing from about the same level of concentration of catalyst as in the WC substrate 14 to a minimum level of concentration approaching almost no catalyst in the diamond table 12 at the upper end or upper surface thereof, although the amount or concentration of catalyst is as minimal as required for formation of the diamond table 12 of the compact 10. The level of concentration of catalyst in the sacrificial layer 12' of coarse diamond powder is significantly less than that of the level of concentration of the catalyst in the WC substrate 14 with the sink 16 having a level of concentration of catalyst peaking at a level of about three times or more of the level of concentration of the catalyst in the WC substrate 14. The catalyst layer 15 may be deleted, if desired, when sufficient catalyst material from the substrate 14 is available during HPHT of the compact 10. It will be appreciated that the volume or mass of the material comprising the sink 16 must be at least approximately equal to or larger than the volume or mass of catalyst material, such as from the catalyst layer 15 and any catalyst that may migrate from the substrate 14 that is to be to be removed from the diamond powder 12 and sacrificial layer 12' of diamond powder. Otherwise, the volume or mass of the sink 16 will not be effective for the removal of the desired amount of catalyst material from the catalyst layer 15, from the layer of diamond powder 12, and from the sacrificial layer 12' of diamond powder.

Figure 3:
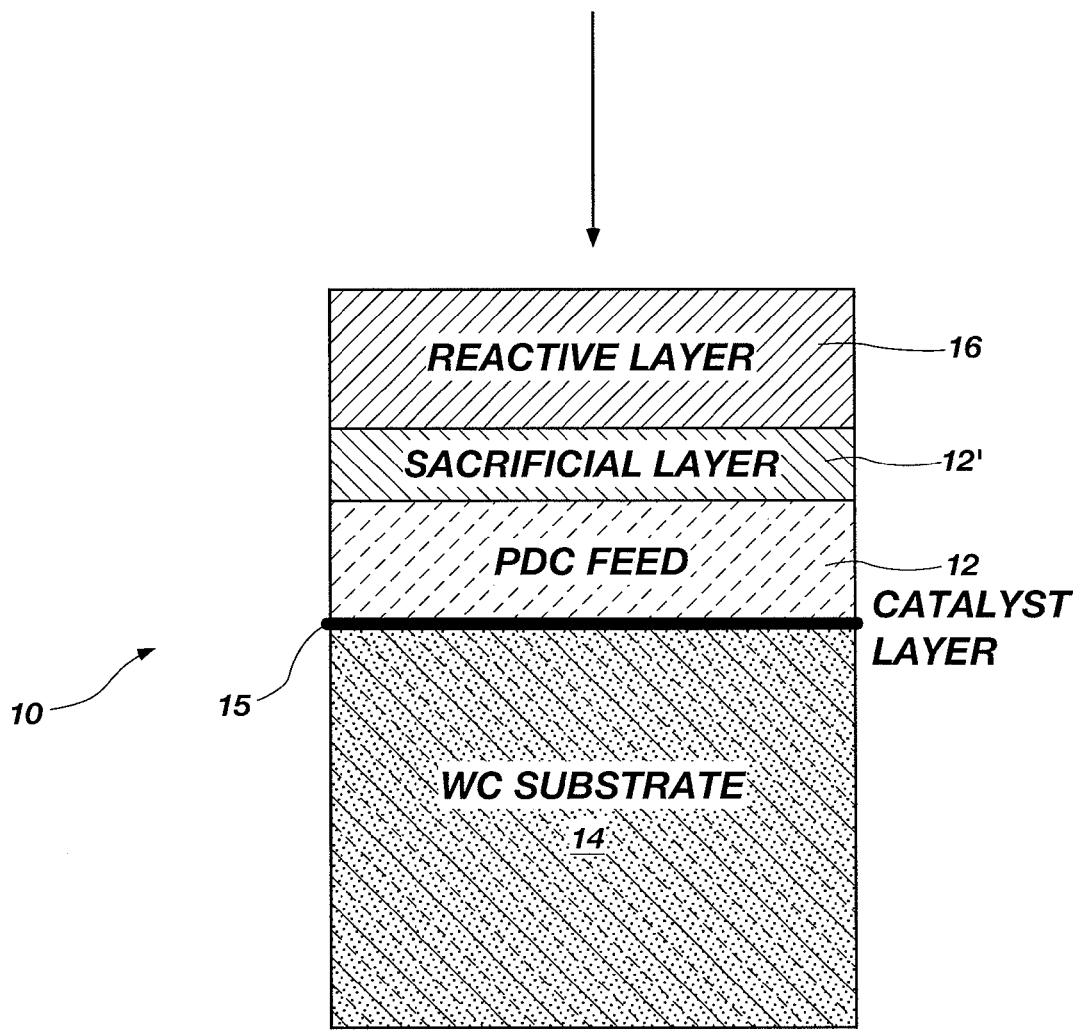
FIG. 3 is a drawing of another embodiment of the present invention of a PDC compact before pressing.

Illustrated in FIG. 3 is another representation of an alternative embodiment of the present invention where a compact 10 is to be pressed under high pressure and high temperature to form a PDC for use as a cutter on a rotary drag bit. The compact 10 includes a substrate 14, a catalyst layer 15, a layer of diamond powder 12, a sacrificial layer or second layer 12' of coarse diamond powder, and a sink 16. As illustrated, the compact 10 includes at least two layers of diamond, one of diamond powder 12 (PDC FEED), typically having a particle size of about 2 microns to about 50 microns, and another of sacrificial layer 12' of coarse diamond particles, typically having a particle size of about 100 microns to about 500 microns, for forming a diamond table for cutting. A catalyst layer 15 contacts the layer of diamond powder 12 for foaming the diamond table from the diamond powder 12 and sacrificial layer 12' of diamond powder and attaching the diamond table to a substrate 14 which is formed from tungsten carbide powder for forming a backup substrate for the diamond table after pressing. A sink 16 which acts as a getter that can react favorably with the catalyst material of the catalyst layer 15 to reduce the concentration of catalyst material in the diamond powder 12 and sacrificial layer 12', after pressing and cooling to form the diamond microstructure of a diamond table 12 of the compact 10. The sink 16 may be any suitable material, such as fine diamond, graphite, metals, or metal alloys which will react at or, preferably, above the reactivity level of the diamond powder. By placing the sink 16 over the tungsten carbide powder, the catalyst layer 15, the diamond powder layer 12, and sacrificial layer 12', the sink causes a solvent gradient to occur across the tungsten carbide powder 14 for the catalyst material therein and the catalyst material in the catalyst layer 15 to migrate to the sink 16 during high pressure and high temperature formation of the compact 10. Because the coarse diamond powder of the sacrificial layer 12' has a particle size in the range of about 100 microns to about 500 microns, the sacrificial layer 12' will not strongly bond to the layer of diamond powder 12 at the interface therebetween during high pressure and high temperature pressing. The overall permeability of the layer of diamond powder 12 and the permeability of the sacrificial layer 12' of coarse diamond powder is determined by the mean free path of open porosity, which is formed by the interstitial regions between individual grain boundaries between grains, and fractures that form under pressure and determines the effectiveness at which any catalyst material migrates therethrough during the high pressure and high temperature process of forming the compact 10 as the closed porosity of the layer of diamond powder 12 and the closed porosity of the sacrificial layer 12' of coarse porous diamond prevents any substantial migration of the catalyst material thereacross. When there is a greater amount of permeability in the layer of diamond powder 12 and permeability in the sacrificial layer 12' of coarse porous diamond particle layer, the catalyst material will migrate through the layer of diamond powder 12 and the sacrificial layer 12' of coarse porous diamond. If a diamond powder is used that has a mean free path of open porosity below the percolation threshold for the grain size distribution, the permeability of the layer of diamond powder 12 may be such that the catalyst material cannot effectively migrate thereacross in any reasonable period of time for the compact formation process.

Figure 4:
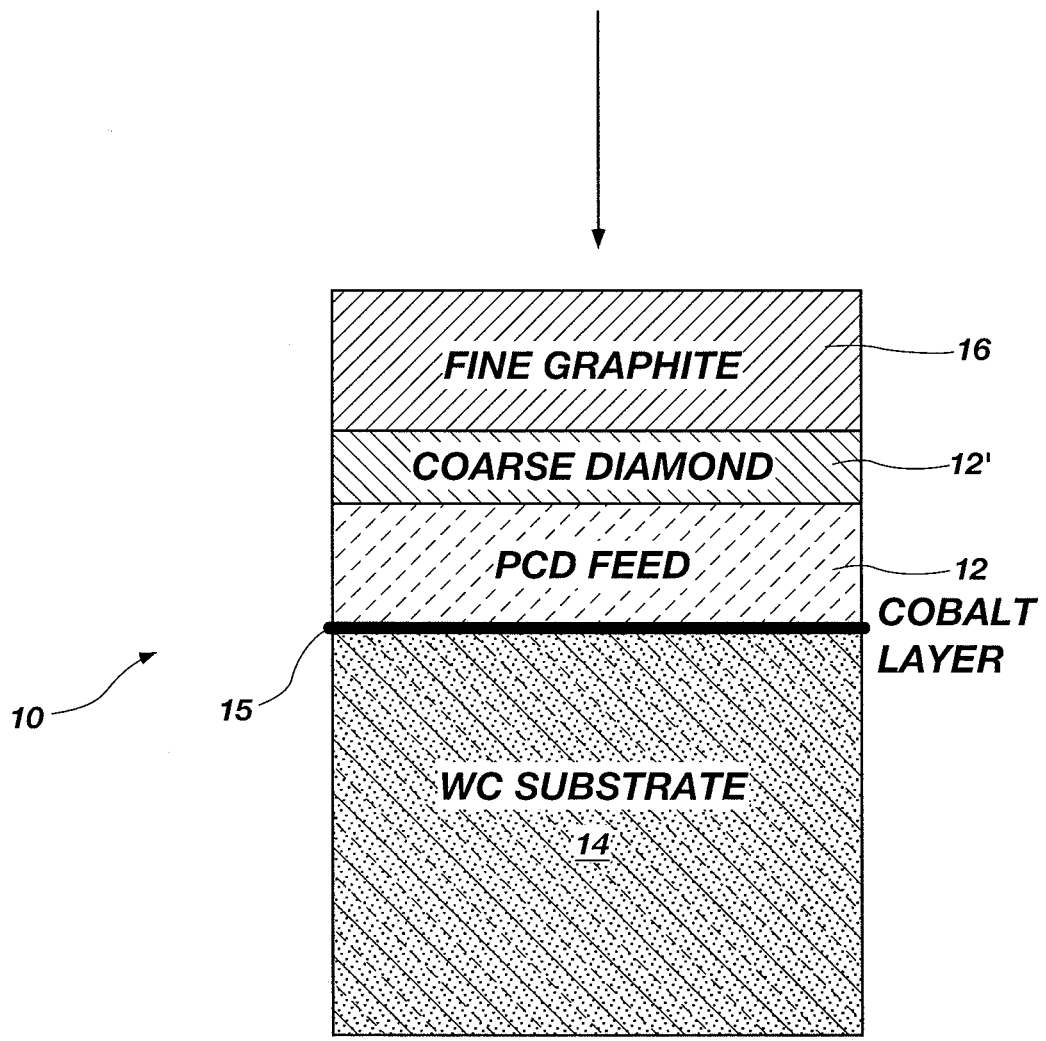
FIG. 4 is a drawing of another embodiment of the present invention of the PDC of FIG. 3 after pressing.

Illustrated in FIG. 4 is another representation of an alternative embodiment of the present invention where a compact 10 is to be pressed under high pressure and high temperature to form a PDC for use as a cutter on a rotary drag bit. The compact 10 includes a substrate 14, a catalyst layer 15, a layer of diamond powder 12, another layer of coarse diamond powder 12', and a sink 16 of fine graphite powder. The compact 10 includes at least two layers of diamond, one of diamond powder 12 having a particle size of about 2 microns to about 50 microns and another of sacrificial layer 12' of coarse diamond particles having a particle size of about 100 microns to about 500 microns for forming a diamond table for cutting. A catalyst layer 15 comprises cobalt and contacts the powdered diamond 12 for attaching a diamond table to a substrate 14 formed from tungsten carbide powder for forming a backup substrate for the diamond table formed from the diamond powder 12 and sacrificial layer 12' of coarse diamond particles having the diamond table secured thereto after pressing. A sink 16 comprising a fine graphite powder which acts as a getter that can react favorably with catalyst material to reduce the concentration of catalyst material in the diamond powder 12 after pressing and cooling to form the diamond microstructure of a diamond table of the compact 10. In embodiments where the sink 16 comprises a carbon or carbon-based material, the sink 16 may cause grain growth and possibly form a hard diamond cap on the sacrificial layer 12'. The sink 16 will react at or, preferably, above the reactivity level of the diamond powder 12 (PCD FEED). By placing the sink 16 opposite the tungsten carbide powder for forming the substrate 14, the catalyst layer 15, the diamond powder 12, and the sacrificial layer 12' of coarse diamond powder, the sink 16 causes a solvent gradient to occur across the tungsten carbide powder 14, the catalyst layer 15, the layer of diamond powder 12 and the sacrificial layer 12' for any catalyst material to migrate to the sink 16 during high pressure and high temperature formation of the compact 10. In other embodiments, the catalyst layer 15 may comprise a disc between the layer of diamond powder 12 and the substrate 14, rather than a layer of powdered catalyst material. If the sacrificial layer 12' of coarse porous diamond powder has an average particle size in the range of about 100 microns to about 500 microns, the sacrificial layer 12' of coarse porous diamond particle layer will not strongly bond to the layer of diamond powder 12 at the interface therebetween. The overall permeability of the layer of diamond powder 12 and the permeability of the sacrificial layer 12' of coarse diamond powder determines the effectiveness at which any solvent catalyst migrates therethrough during the high pressure and high temperature process of forming the compact 10 as the closed porosity of the layer of diamond powder 12 and the closed porosity of the sacrificial layer 12' of coarse diamond powder prevents or limits any migration of the catalyst material thereacross. When there is greater permeability of the layer of diamond powder 12 and the permeability of the sacrificial layer 12' of coarse diamond powder, the solvent catalyst will migrate with greater effectiveness through the layer of diamond powder 12 and the sacrificial layer 12' of coarse diamond powder. If a diamond powder is used that has a mean free path of open porosity below the percolation threshold for the grain size distribution, the permeability of the layer of diamond powder 12 may be such that the catalyst material cannot effectively migrate thereacross in any reasonable period of time for the compact formation process.

Figure 5:
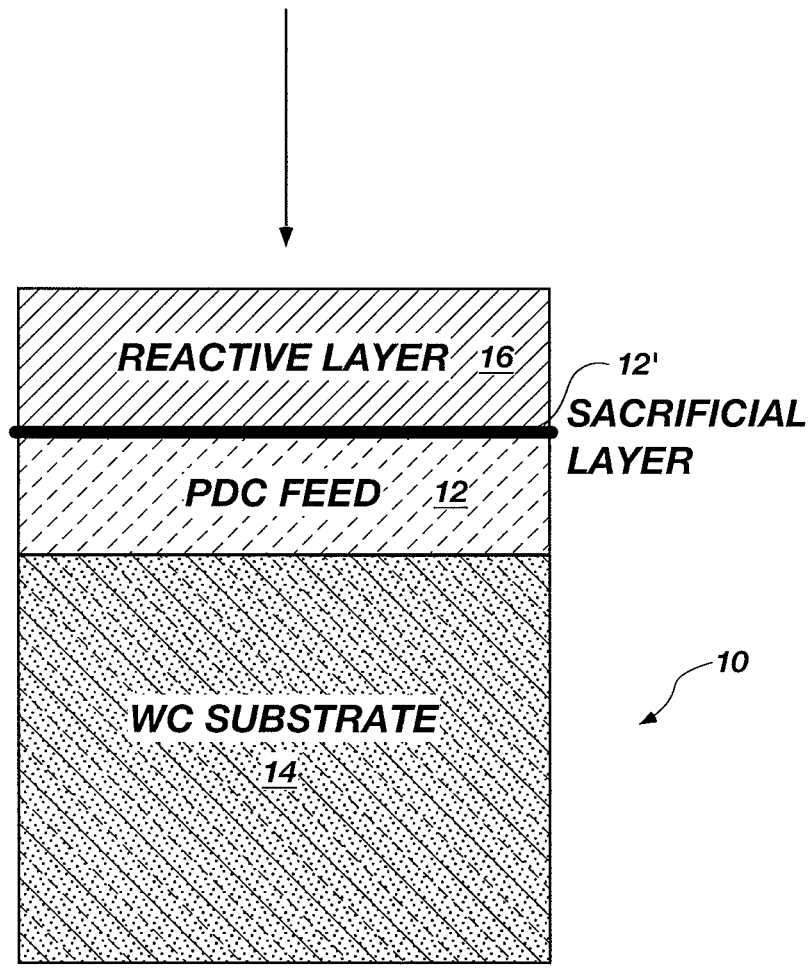
FIG. 5 is a drawing of another embodiment of the present invention of a PDC compact before pressing.

Illustrated in FIG. 5 is another representation of an alternative embodiment of the present invention where a compact 10 is to be pressed under high pressure and high temperature to form a PDC for use as a cutter on a rotary drag bit. The compact 10 includes a substrate 14, a layer of diamond powder 12, a small or thin sacrificial layer of coarse diamond powder 12', when compared to the thickness of the layer 12 of diamond powder, and a sink 16. The compact 10 includes at least two layers of diamond, one of diamond powder 12, typically having a particle size of about 2 microns to about 50 microns, and another of sacrificial layer 12' of coarse diamond powder, typically having a particle size of about 100 microns to about 500 microns that are used for forming a diamond table for cutting. A catalyst material, such as, for example, cobalt powder, is mixed with the diamond powder 12. A catalyst layer 15 catalyzes formation of the diamond table from the diamond powder 12 and sacrificial layer 12' and aids in attaching the diamond table to a substrate 14 formed from tungsten carbide powder for forming a backup substrate for the diamond table after pressing. A sink 16 (a reactive layer) acts as a getter that can react favorably with any cobalt solvent catalyst to reduce the concentration of the cobalt solvent catalyst in the diamond powder 12 and sacrificial layer 12' of diamond powder after pressing and cooling to form diamond microstructure of a diamond table 12 of the compact 10. The sink 16 may be any suitable material such as fine diamond, graphite, metals, or metal alloys which will react at or, preferably, above the reactivity level of the diamond powder. By placing the sink 16 opposite the tungsten carbide powder of the substrate 14, diamond powder 12, the sacrificial layer 12' of coarse diamond powder, the sink 16 causes a solvent gradient to occur across the diamond powder layer 12 (PCD FEED) having cobalt solvent catalyst therein for the cobalt solvent catalyst to migrate to the sink 16 during high pressure and high temperature formation of the compact 10. Because the sacrificial layer 12' of coarse diamond powder has a particle size in the range of about 100 microns to about 500 microns, the sacrificial layer 12' of coarse porous diamond particle layer 12' will not strongly bond to the diamond layer 12 at the interface therebetween. The overall permeability of the diamond layer 12 and the permeability of the sacrificial layer 12' of diamond powder determines the effectiveness at which the solvent catalyst migrates therethrough during the high pressure and high temperature process of forming the compact 10 as the closed porosity of the diamond layer 12 and the closed porosity of the sacrificial layer 12' of coarse diamond powder prevents any substantial migration of the catalyst thereacross. When there is a large amount of permeability in the diamond layer 12 and permeability in the sacrificial layer 12' of coarse diamond powder, any solvent catalyst in the diamond powder 12 will migrate with a greater effectiveness through the diamond layer 12 and the sacrificial layer 12' of coarse diamond powder. If a diamond powder 12 or a sacrificial layer 12' of coarse diamond powder is used that has mean free path of open porosity below the percolation threshold for the grain size distribution, the permeability of the diamond layer 12 and the sacrificial layer 12' may be such that the catalyst cannot effectively migrate thereacross in any reasonable period of time for the compact formation process.

Figure 6:
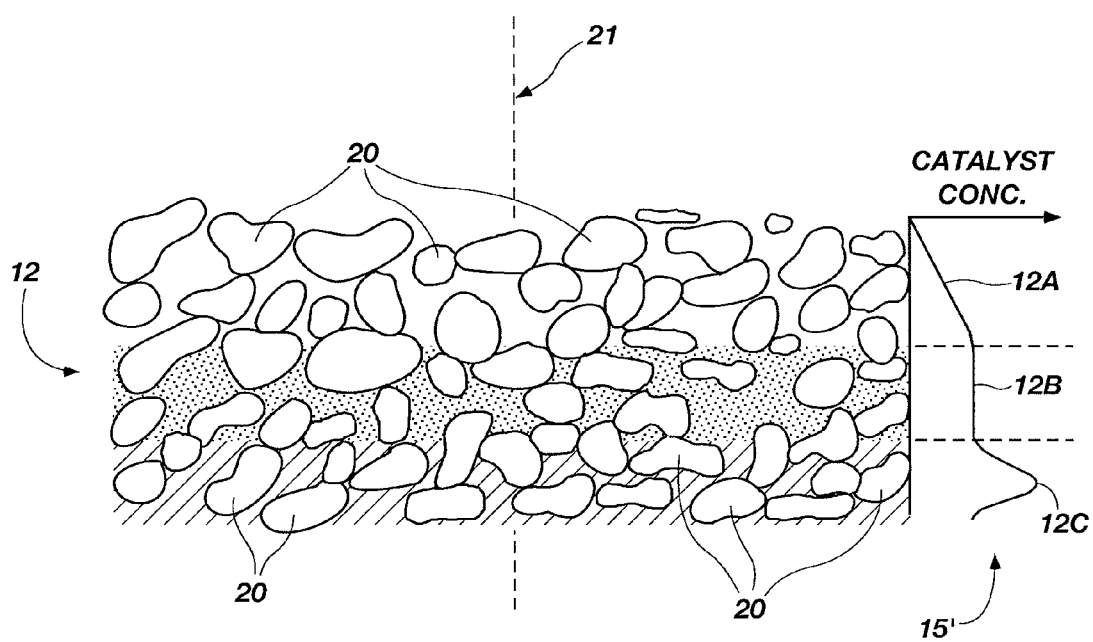
FIG. 6 illustrates a simplified cross-sectional view of a polycrystalline table microstructure in accordance with an embodiment of the present disclosure.

Referring to FIG. 6, a simplified cross-sectional view of a polycrystalline table 12 microstructure according to an embodiment of the present disclosure is shown. The microstructure shown in FIG. 6 is representative of a polycrystalline table 12 microstructure that may result from any of the formation processes discussed in relation to FIGS. 1 through 5. The polycrystalline table 12 comprises a plurality of continuously inter-bonded grains of a superhard material 20 and a quantity of catalyst material 12A through 12C disposed in interstitial spaces between the grains 20. The grains of superhard material 20 are continuously inter-bonded in three dimensions, including in a direction parallel to a central axis 21 of the polycrystalline table 12, such that there is an uninterrupted polycrystalline structure. The grains of superhard material 20 may have an at least substantially uniform mean grain size throughout the polycrystalline table 12. For example, a cross-section of the polycrystalline table 12 may be taken in each of the sections of the polycrystalline table 12 comprising varying quantities of catalyst material 12A, 12B, and 12C. In each cross-section, the mean grain size of the continuously inter-bonded grains of superhard material 20 may be at least substantially equal to the mean grain size of the continuously inter-bonded grains of superhard material 20 in the other cross-sections. The grains of superhard material 20 may have a mean grain size of about 2 microns to about 50 microns and each grain 20 of the plurality 20 may be at least substantially similarly sized to the mean size. The grains of superhard material 20 may comprise a mono-modal or multi-modal grain size distribution. In a multi-modal grain size distribution, the standard deviation for grain size may be larger than in a mono-modal grain size distribution; however, the mean grain size of the continuously inter-bonded grains of superhard material 20 may be at least substantially constant throughout the polycrystalline table in either type of grain size distribution. By way of non-limiting example, the grains of superhard material 20 may have a mean grain size of about 40 microns, with a standard deviation of about 10 microns. In another embodiment, the grains of superhard material may have a mean grain size of about 30 microns with a standard deviation of about 5 microns. In another embodiment, the grains of superhard material may have a mean grain size of about 10 microns with a standard deviation of about 3 microns.

Interstitial spaces between the continuously inter-bonded grains of superhard material 20 may each comprise a volume. A mean volume of the interstitial spaces between the grains of superhard material 20 may be at least substantially uniform throughout the polycrystalline table. For example, a cross-section of the polycrystalline table 12 may be taken in each of the sections of the polycrystalline table 12 comprising varying quantities of catalyst material 12A, 12B, and 12C. In each cross-section, the mean volume of the interstitial spaces between grains of superhard material 20 may be at least substantially equal to the mean volume of the interstitial spaces in the other cross-sections.

The quantity of catalyst material 12A through 12C may vary across the polycrystalline table 12 in a direction parallel to a central axis 21 of the polycrystalline table 12. For example, as shown in the graphic representation 15' adjacent to the polycrystalline table 12, the polycrystalline table 12 comprises first, second, and third volume percentages of catalyst material 12A, 12B, and 12C expressed as volume percentages of the polycrystalline table 12. The first, second, and third volume percentages of catalyst material 12A, 12B, and 12C vary axially through the polycrystalline table 12 in a direction parallel to a central axis 21 of the polycrystalline table 12. The variance in the first, second, and third volume percentages of catalyst material 12A, 12B, and 12C illustrates the non-uniform distribution of catalyst material throughout the polycrystalline table 12. The cutting face of the polycrystalline table 12 may be at least substantially free of catalyst material, as shown in the graphic representation 15' illustrating the first volume percentage of catalyst material 12A as being smaller than the second and third volume percentages of catalyst material 12B and 12C. The polycrystalline table 12 comprises a plurality of inter-bonded grains of a superhard material 20. The catalyst material is disposed in interstitial spaces between the inter-bonded grains of superhard material 20, which form a polycrystalline structure. In summary, the polycrystalline table 12 may comprise non-uniform first, second, and third volume percentages of catalyst material 12A, 12B, and 12C and inter-bonded grains of superhard material 20 of at least substantially uniform size. The non-uniform first, second, and third volume percentages of catalyst material 12A, 12B, and 12C may enhance the thermal stability of the polycrystalline table 12 without the need for leaching while enabling sufficient attachment of the polycrystalline table 12 to a substrate 14 and enabling a uniform particle size of the inter-bonded grains of superhard material 20 to be present in the polycrystalline table 12. In some embodiments, the polycrystalline table 12 may subsequently be leached to remove additional catalyst material from the interstitial spaces between inter-bonded grains of a superhard material 20.

The polycrystalline table 12 may also be described as comprising a plurality of layers, each layer being characterized as comprising a volume percentage of catalyst material 12A, 12B, and 12C. For example, the polycrystalline table 12 may comprise a first layer comprising a first volume percentage of catalyst material 12A, a second layer comprising a second volume percentage of catalyst material 12B, and a third layer comprising a third volume percentage of catalyst material 12C. The second layer is interposed between and bonded to the first and third layers. Each layer may comprise a disc shape, and extend in a direction transverse to a central axis of the polycrystalline table. In other embodiments, each layer may comprise a stratum of a cylinder, a cone, a dome, a pyramid, or any other shape configured to engage an earth formation as known in the art. The first, second and third layers may extend in a direction transverse to a central axis 21 of the polycrystalline table 12. The second volume percentage of catalyst material 12B is greater than the first volume percentage of catalyst material 12A and less than the third volume percentage of catalyst material 12C. The catalyst material may be disposed in interstitial spaces between continuously inter-bonded grains of superhard material 20.

Figure 7:
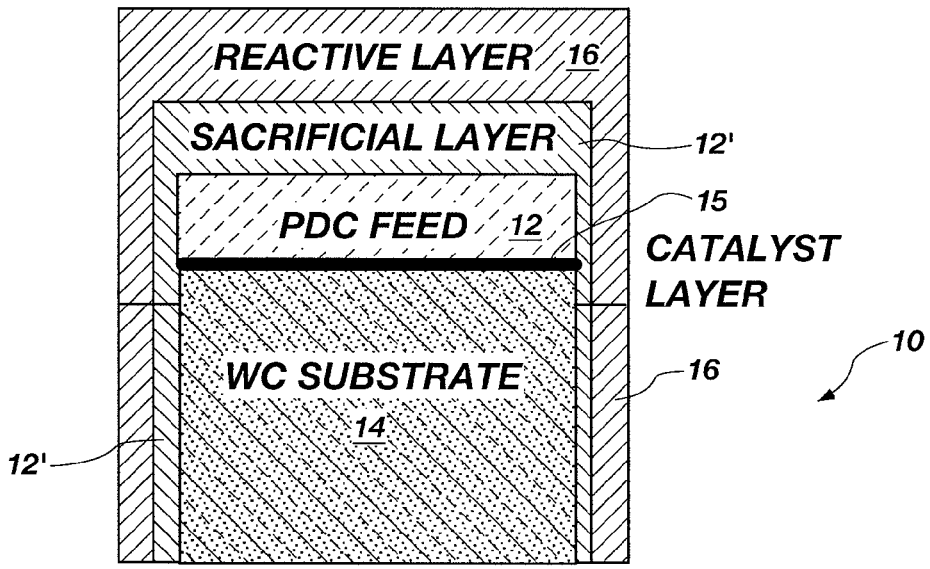
FIG. 7 is a drawing of another embodiment of the present invention of a PDC compact before pressing.

Illustrated in FIG. 7 is another representation of an alternative embodiment of the present invention where a compact 10 is to be pressed under high pressure and high temperature to form a PDC for use as a cutter on a rotary drag bit. The compact includes a substrate 14, a catalyst layer 15, a layer of powdered diamond 12, a sacrificial layer 12' of diamond powder extending around the top surface and circumference of the layer of powdered diamond 12, extending around the circumference of the catalyst layer 15, and extending around the circumference of the substrate 14, and a sink 16 comprising a reactive layer extending over the top or upper surface and over or around the entire circumference of the sacrificial layer 12' of diamond powder. The compact 10 includes at least two layers of diamond, one of diamond powder 12, typically having a particle size of about 5 microns to about 40 microns, and another of sacrificial layer 12' of coarse diamond powder, typically having a particle size of about 100 microns to about 500 microns, for forming a diamond table for cutting, each layer 12 and 12' extending around a portion of the tungsten carbide powder 14. A catalyst layer 15 contacts the substrate 14 and contacts the powdered diamond 12 for forming the diamond table from the diamond powder 12 and sacrificial layer 12' of diamond powder and attaching the diamond table to a substrate 14 formed from tungsten carbide powder for forming a backup substrate for the diamond table after pressing. A sink 16 comprising a reactive layer extends around the diamond layers 12 and 12' as well as the tungsten carbide powder 14 with the sink 16 acting as a getter that can react favorably with catalyst material of the catalyst layer 15 to reduce the concentration of the catalyst material in the diamond powder 12 and sacrificial layer 12' of coarse diamond powder after pressing and cooling to form diamond microstructure of a diamond table 12 of the compact 10. The sink 16 may be any suitable material such as fine diamond, graphite, metals, or metal alloys which will react at or, preferably, above the reactivity level of the diamond powder. By placing the sink 16 opposite and around the diamond powder 12 and sacrificial layer 12' of diamond powder, the sink 16 causes a solvent gradient to occur across the tungsten carbide powder 14 the diamond powder 12, and the sacrificial layer 12' for any catalyst material to migrate to the sink 16 during high pressure and high temperature formation of the compact 10. Because the coarse diamond powder 12' has a particle size in the range of about 500 microns to about 1000 microns, the sacrificial layer 12' of coarse diamond powder will not strongly bond to the diamond layer 12 at any interface therebetween. The overall permeability of the diamond layer 12 and the permeability of the sacrificial layer 12' of coarse diamond powder determines the effectiveness at which catalyst material migrates therethrough during the high pressure and high temperature process of forming the compact 10 as the closed porosity of the diamond layer 12 and the closed porosity of the sacrificial layer 12' of coarse diamond powder prevents any substantial migration of the catalyst material thereacross. When there is a large amount of permeability in the diamond layer 12 and permeability in the sacrificial layer 12' of coarse diamond powder, the catalyst material will migrate with greater effectiveness through the diamond layer 12 and the sacrificial layer 12' of coarse diamond powder. If a diamond powder 12 and/or sacrificial layer of coarse diamond powder 12' is used that has a mean free path of open porosity below the percolation threshold for the grain size distribution, the permeability of the diamond layer 12 and/or the sacrificial layer 12' of coarse diamond powder may be such that the catalyst material cannot effectively migrate thereacross in any reasonable period of time for the compact formation process.

Figure 8:
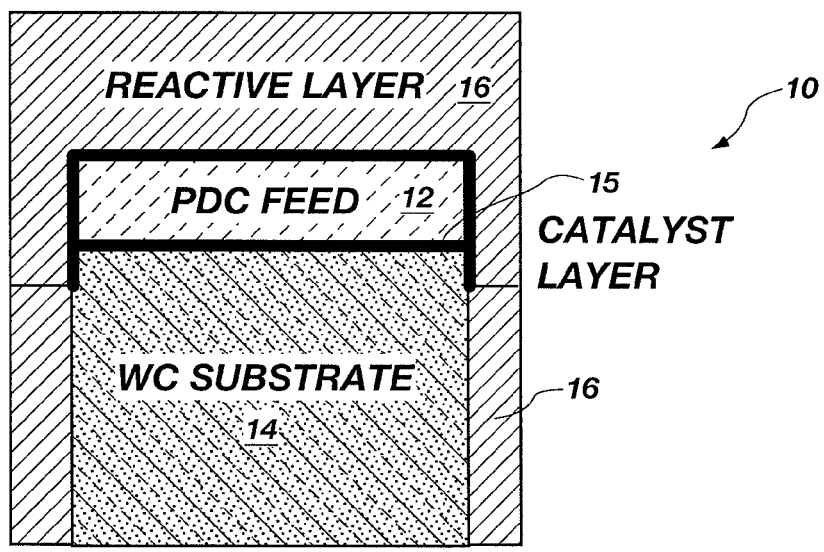
FIG. 8 is a drawing of another embodiment of the present invention of a PDC compact before pressing.

Illustrated in FIG. 8 is another representation of an alternative embodiment of the present invention where a compact 10 is to be pressed under high pressure and high temperature to form a PDC for use as a cutter on a rotary drag bit. The compact 10 includes a substrate 14, a catalyst layer 15, a layer of diamond powder 12 (PDC FEED), and a sink 16 comprising a reactive layer. The compact 10 includes a layer of diamond powder 12, typically having a particle size of about 5 microns to about 40 microns, for forming a diamond table for cutting. A catalyst layer 15 extends around the diamond powder 12 on all sides thereof including the circumference thereof and an upper portion of the tungsten carbide powder of the substrate 14 for forming a backup substrate for the diamond table after pressing. A sink 16 extending around the upper surface and circumference of the catalyst layer 15, and a portion of the tungsten carbide powder of the substrate 14. The sink 16 acts as a getter that can react favorably with catalyst material of the catalyst layer 15 to reduce the concentration of catalyst material in the diamond powder 12 after pressing and cooling to form the diamond microstructure of a diamond table 12 of the compact 10. The sink 16 may be any suitable material such as fine diamond, graphite, metals, or metal alloys which will react at or, preferably, above the reactivity level of the diamond powder. By placing the sink 16 around the catalyst layer 15 and the tungsten carbide powder of the substrate 14, the sink 16 causes a solvent gradient to occur across the tungsten carbide powder of the substrate 14 for any catalyst material to migrate to the sink 16 during high pressure and high temperature formation of the compact 10. The overall permeability of the layer of diamond powder 12 determines the effectiveness at which the catalyst material migrates therethrough during the high pressure and high temperature process of forming the compact 10 as the closed porosity of the layer of diamond powder 12 prevents any substantial migration of the catalyst material thereacross. When there is a large amount of permeability in the layer of diamond powder 12, the catalyst material will migrate with greater effectiveness through the layer of diamond powder 12. If a diamond powder 12 is used that has a mean free path of open porosity below the percolation threshold for the grain size distribution, the permeability of the layer of diamond powder 12 may be such that the catalyst material cannot effectively migrate thereacross in any reasonable period of time for the compact formation process.

Figure 9:
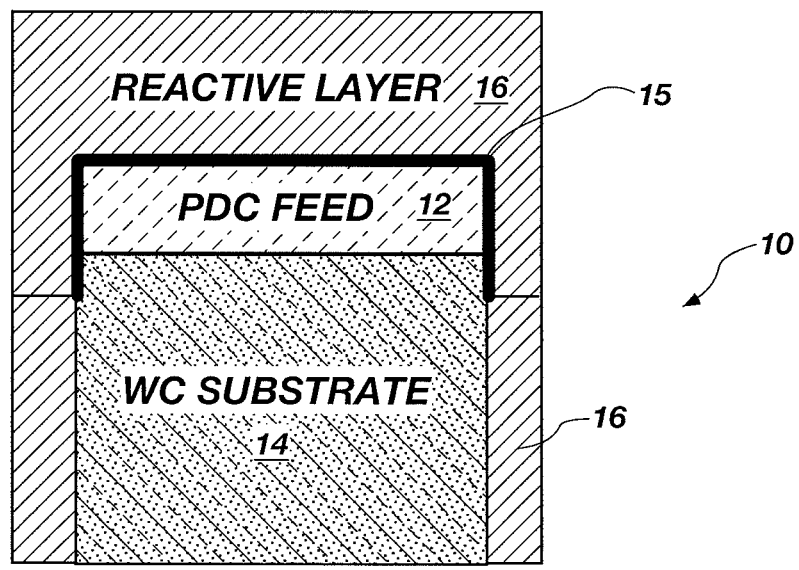
FIG. 9 is a drawing of another embodiment of the present invention of a PDC compact before pressing.

Illustrated in FIG. 9 is another representation of an alternative embodiment of the present invention where a compact 10 is to be pressed under high pressure and high temperature to form a PDC for use as a cutter on a rotary drag bit. The compact 10 includes a substrate 14, a layer of diamond powder 12, a catalyst layer 15 contacting the layer of diamond powder 12 on the top side and circumference thereof and an upper portion of the substrate 14, and a sink 16 comprising a reactive layer. The compact 10 includes a layer of diamond powder 12 (PCD FEED), typically having a particle size of about 5 microns to about 40 microns, for forming a diamond table for cutting, a catalyst layer 15 extending around the layer of diamond powder 12 on the upper surface thereof and around the circumference and an upper portion of the tungsten carbide powder of the substrate 14, any desired amount, for forming the diamond table from the diamond powder 12 and attaching the diamond table to a substrate 14 formed from tungsten carbide powder for forming a backup substrate for the diamond table after pressing. A sink 16 extending around the catalyst layer 15, and a portion of the tungsten carbide powder 14, any desired amount, acting as a getter that can react favorably with the catalyst material of the catalyst layer 15 around the layer of diamond powder 12 and any solvent catalyst in the substrate 14 to reduce the concentration of the catalyst material in the diamond powder 12 after pressing and cooling to form the diamond microstructure of a diamond table 12 of the compact 10. The sink 16 may be any suitable material such as fine diamond, graphite, metals, or metal alloys which will react at or, preferably, above the reactivity level of the diamond powder 12. By placing the sink 16 around the diamond powder 12 and the substrate 14, the sink 16 causes a solvent gradient to occur across the tungsten carbide powder of the substrate 14 for any catalyst material to migrate to the sink 16 during high pressure and high temperature formation of the compact 10. The overall permeability of the layer of diamond powder 12 determines the effectiveness at which the catalyst material migrates through the diamond powder 12 during the high pressure and high temperature process of forming the compact 10 as the closed porosity of the diamond powder 12 prevents any substantial migration of the catalyst thereacross. When there is a large amount of permeability in the diamond powder 12, any catalyst material will migrate with greater effectiveness through the layer of diamond powder 12. If a diamond powder 12 is used that has a mean free path of open porosity below the percolation threshold for the grain size distribution, the permeability of the layer of diamond powder layer 12 may be such that the catalyst cannot effectively migrate thereacross in any reasonable period of time for the compact formation process.

Figure 10:
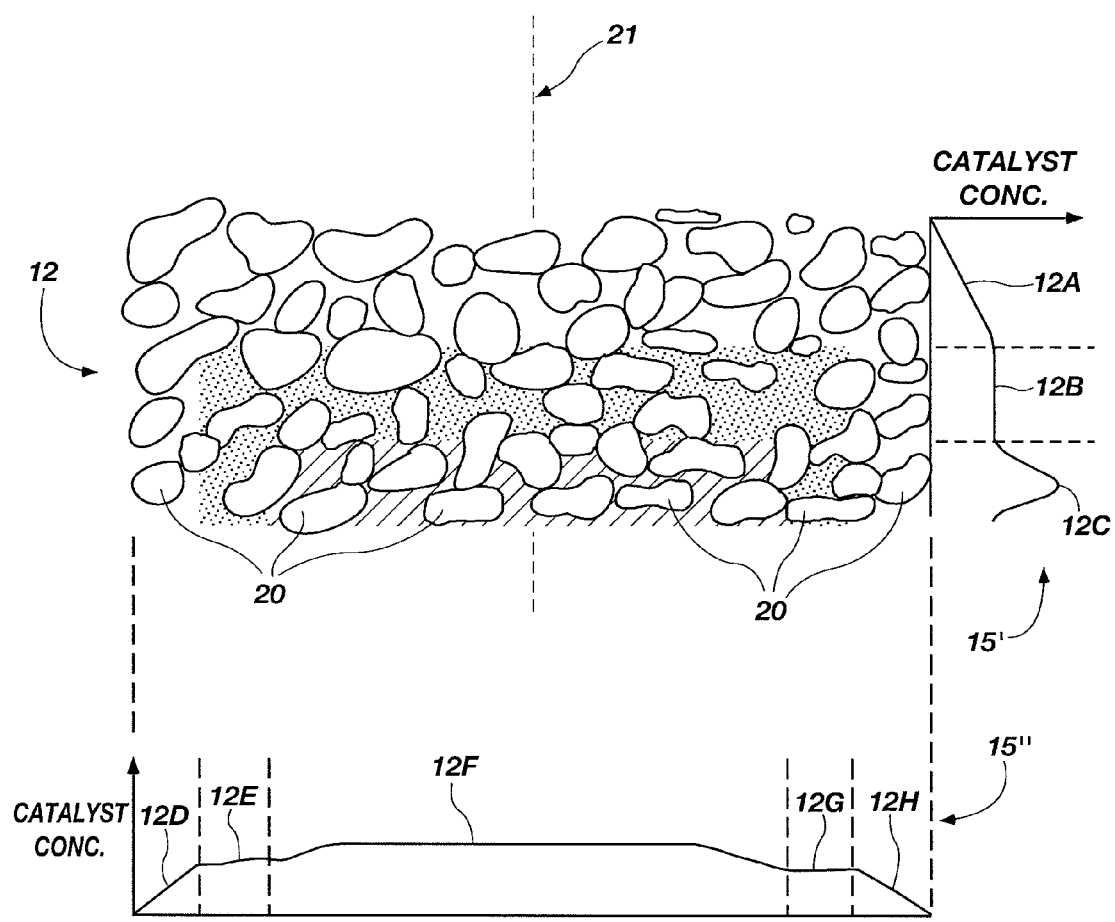
FIG. 10 illustrates a simplified cross-sectional view of a polycrystalline table microstructure in accordance with an embodiment of the present disclosure.

Referring to FIG. 10, a simplified cross-sectional view of a polycrystalline table 12 microstructure according to an embodiment of the present disclosure is shown. The microstructure shown in FIG. 10 is representative of a polycrystalline table 12 microstructure that may result from any of the formation processes discussed in relation to FIGS. 7 through 9. The polycrystalline table 12 comprises a plurality of inter-bonded grains of a superhard material 20 and a quantity of catalyst material 12A through 12H disposed in interstitial spaces between the grains 20. The grains of superhard material 20 are continuously inter-bonded in three dimensions, including a direction parallel to a central axis 21 of the polycrystalline table 12, such that there is an uninterrupted polycrystalline structure. The grains of superhard material 20 may have an at least substantially uniform mean grain size throughout the polycrystalline table 12. For example, a cross-section of the polycrystalline table 12 may be taken in each of the sections of the polycrystalline table 12 comprising varying quantities of catalyst material 12A through 12H. In each cross-section, the mean grain size of the continuously inter-bonded grains of superhard material 20 may be at least substantially equal to the mean grain size of the continuously inter-bonded grains of superhard material 20 in the other cross-sections. The grains of superhard material 20 may have a mean grain size of about 2 microns to about 50 microns and each grain of superhard material 20 of the plurality may be at least substantially similar in size to the mean grain size. The grains of superhard material 20 may comprise a mono-modal or multi-modal grain size distribution. In a multi-modal grain size distribution, the standard deviation for grain size may be larger than in a mono-modal grain size distribution; however, the mean grain size of the continuously inter-bonded grains of superhard material 20 may be at least substantially constant throughout the polycrystalline table in either type of grain size distribution. By way of non-limiting example, the grains of superhard material 20 may have a mean grain size of about 40 microns, with a standard deviation of about 10 microns. In another embodiment, the grains of superhard material may have a mean grain size of about 30 microns with a standard deviation of about 5 microns. In another embodiment, the grains of superhard material may have a mean grain size of about 10 microns with a standard deviation of about 3 microns.

Interstitial spaces between the continuously inter-bonded grains of superhard material 20 may each comprise a volume. A mean volume of the interstitial spaces between the grains of superhard material 20 may be at least substantially uniform throughout the polycrystalline table. For example, a cross-section of the polycrystalline table 12 may be taken in each of the sections of the polycrystalline table 12 comprising varying quantities of catalyst material 12A through 12H. In each cross-section, the mean volume of the interstitial spaces between grains of superhard material 20 may be at least substantially equal to the mean volume of the interstitial spaces in the other cross-sections.

The quantity of catalyst material 12A through 12C may vary across the polycrystalline table 12 in a direction parallel to a central axis 21 of the polycrystalline table 12. As shown in the graphic representation 15' adjacent to the polycrystalline table 12, the polycrystalline table 12 comprises first, second, and third axially varying volume percentages of catalyst material 12A, 12B, and 12C expressed as volume percentages of the polycrystalline table 12. In addition, the quantity of catalyst material 12D through 12H may vary across the polycrystalline table in a direction transverse to the central axis 21 of the polycrystalline table 12. The graphic representation 15" below the polycrystalline table 12 shows fourth, fifth, sixth, seventh, and eighth radially varying volume percentages of catalyst material 12D, 12E, 12F, 12G, and 12H throughout the polycrystalline table 12. The fourth through eighth volume percentages of catalyst material 12D through 12H vary through the polycrystalline table 12 in a direction transverse to the central axis 21 of the polycrystalline table 12. The cutting face and peripheral side of the polycrystalline table 12 may be at least substantially free of catalyst material, as shown in the graphic representations 15' and 15" illustrating the first, fourth, and eighth volume percentages of catalyst material 12A, 12D, and 12H as being smaller than the second, third, fifth, sixth, and seventh volume percentages of catalyst material 12B, 12C, 12E, 12F, and 12G. The polycrystalline table 12 comprises a plurality of inter-bonded grains of a superhard material 20. The catalyst material is disposed in interstitial spaces between the inter-bonded grains of superhard material 20, which form a polycrystalline structure. In summary, the polycrystalline table 12 may comprise axially non-uniform first, second, and third volume percentages of catalyst material 12A, 12B, and 12C and inter-bonded grains of superhard material 20 of at least substantially uniform size. Additionally, the polycrystalline table 12 may comprise radial non-uniform fourth, fifth, sixth, seventh, and eighth non-uniform volume percentages of catalyst material 12D, 12E, 12F, 12G, and 12H. The non-uniform first through eighth volume percentages of catalyst material 12A through 12H may enhance the thermal stability of the polycrystalline table 12 without leaching while enabling sufficient attachment of the polycrystalline table 12 to a substrate 14 and enabling a uniform particle size of the inter-bonded grains of superhard material 20 to be present in the polycrystalline table 12.

In some embodiments, the polycrystalline table 12 may also be described as comprising a plurality of layers, each layer being characterized as comprising a volume percentage of catalyst material. For example, a first layer may extend in a direction transverse to a central axis 21 of the polycrystalline table 12 and include an annular extension at the perimeter of the first layer. The first layer may comprise a first volume percentage of catalyst material 12A, 12D, and 12H. A second layer nested within and bonded to the first layer may extend in a direction transverse to a central axis 21 of the polycrystalline table 12 and include an annular extension at the perimeter of the second layer. The second layer may comprise a second volume percentage of catalyst material 12B, 12E, and 12G. A third layer may extend in a direction transverse to a central axis 21 of the polycrystalline table 12 and be nested within and bonded to the second layer at an end opposing the first layer. The third layer may comprise a third volume percentage of catalyst material 12C and 12F. In other embodiments, each layer may comprise a stratum of a cylinder, a cone, a dome, a pyramid, or any other shape as known in the art. The second volume percentage of catalyst material 12B, 12E, and 12G may be greater than the first volume percentage of catalyst material 12A, 12D, and 12H and less than the third volume percentage of catalyst material 12C and 12F. Put another way, the quantity of catalyst material may be smallest at the cutting face and down the side (as shown at 12A, 12D, and 12H) of the polycrystalline table 12, and the quantity of catalyst material may increase as the distance from the cutting face and the side surface increases (as shown at 12B, 12C, 12E, 12F, and 12G). The quantities of catalyst material 12A through 12H may be disposed in interstitial spaces between continuously inter-bonded grains of superhard material 20.

It is important to note that a polycrystalline table having grains of superhard material that do not have an at least substantially uniform mean grain size may be formed from starting superhard particles that have an at least substantially uniform mean particle size. For example, superhard particles may be provided on a substrate and subjected to an HTHP process, wherein a catalyst material is swept from the substrate through the superhard particles. The catalyst material catalyzes grain growth, causing the superhard particles to grow and form inter-granular bonds. Thus, superhard particles near the substrate may be in the presence of the catalyst for a longer duration of time than superhard particles that are farther from the substrate, causing grains near the substrate to grow larger than grains distant from the substrate. Thus, grains near the substrate may have a larger mean grain size than the mean grain size of grains that are distant from the substrate. Alternatively, powdered catalyst material may be mixed with superhard particles and provided on a substrate. In this way, catalyst need not be swept from the substrate, and the superhard particles may exhibit at least substantially similar grain growth. However, the catalyst may be present in at least substantially uniform quantities throughout the polycrystalline table, and may require leaching to remove catalyst from interstitial spaces between inter-bonded grains to improve the thermal stability of the diamond table.

While the present invention has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

What is claimed is:

1. A cutting element, comprising:
    a substrate; and
    an unleached polycrystalline table attached on an end of the substrate, the polycrystalline table comprising a plurality of continuously inter-bonded grains of a superhard material and an unaltered quantity of catalyst material used to catalyze inter-bonding of the grains of the superhard material disposed in interstitial spaces between grains of the plurality of continuously inter-bonded grains of a superhard material,
    wherein a mean grain size of the plurality of continuously inter-bonded grains is at least substantially uniform throughout the polycrystalline table, a mean volume of the interstitial spaces between grains of the plurality of continuously inter-bonded grains is at least substantially uniform across the polycrystalline table in a direction parallel to a central axis of the polycrystalline table, and the quantity of catalyst material varies across the polycrystalline table in the direction parallel to the central axis of the polycrystalline table.

2. The cutting element of claim 1, wherein the quantity of catalyst material further varies across the polycrystalline table in a direction transverse to a central axis of the polycrystalline table.

3. The cutting element of claim 1, wherein the at least substantially uniform mean grain size comprises a mean grain size of about 2 microns to about 50 microns.

4. The cutting element of claim 1, wherein a grain size distribution of the grains of the plurality of continuously inter-bonded grains of a superhard material is multi-modal.

5. The cutting element of claim 1, wherein the superhard material comprises a material selected from the group consisting of natural diamond, synthetic diamond, a combination of natural and synthetic diamond, cubic boron nitride, and cubic boron carbo-nitride.

6. The cutting element of claim 1, wherein the catalyst material comprises a material selected from the group consisting of cobalt, iron, nickel, and alloys of these.

7. A cutting element, comprising:
    a substrate; and
    an unleached polycrystalline table attached on an end of the substrate, the polycrystalline table comprising a plurality of continuously inter-bonded grains of a superhard material and an unaltered quantity of catalyst material used to catalyze inter-bonding of the grains of the superhard material disposed in interstitial spaces between grains of the plurality of continuously inter-bonded grains,
    wherein a mean volume of the interstitial spaces between grains of the plurality of continuously inter-bonded grains is at least substantially uniform throughout the polycrystalline table and the quantity of catalyst material varies across the polycrystalline table in a direction parallel to a central axis of the polycrystalline table.

8. The cutting element of claim 7, wherein the quantity of catalyst material further varies across the polycrystalline table in a direction transverse to a central axis of the polycrystalline table.

9. The cutting element of claim 7, wherein a grain size distribution of the grains of the plurality of continuously inter-bonded grains of a superhard material is multi-modal.

10. A cutting element, comprising:
    a substrate; and
    an unleached polycrystalline table attached on an end of the substrate, the polycrystalline table comprising:
        a first layer at an end of the unleached polycrystalline table opposing the substrate, the first layer comprising a first plurality of inter-bonded grains of a superhard material and a first volume percentage of unaltered catalyst material used to catalyze inter-bonding of the grains of the superhard material disposed in interstitial spaces between inter-bonded grains of the first plurality;
        a second layer comprising a second plurality of inter-bonded grains of a superhard material, the second plurality of inter-bonded grains being continuously inter-bonded with the first plurality of inter-bonded grains, and a second volume percentage of unaltered catalyst material used to catalyze inter-bonding of the grains of the superhard material disposed in interstitial spaces between grains of the second plurality, the second volume percentage of catalyst material being greater than the first volume percentage of catalyst material; and
        a third layer interposed between the second layer and the substrate, the third layer comprising a third plurality of inter-bonded grains of a superhard material, the third plurality of inter-bonded grains being continuously inter-bonded with the second plurality of inter-bonded grains, and a third volume percentage of unaltered catalyst material used to catalyze inter-bonding of the grains of the superhard material disposed in interstitial spaces between grains of the third plurality, the third volume percentage of catalyst material being greater than the second volume percentage of catalyst material,
    wherein each of the first, second, and third layers extends in a direction transverse to a central axis of the polycrystalline table and a mean volume of interstitial spaces between continuously inter-bonded grains of the first, second, and third layers is at least substantially uniform.

11. The cutting element of claim 10, wherein at least the first and second layers further comprise annular portions extending in a direction parallel to the central axis of the polycrystalline table, the third layer being nested within the second layer and the second layer being nested within the first layer.

12. A cutting element, comprising:
    a substrate; and
    an unleached polycrystalline table comprising a catalyst material disposed in interstitial spaces between continuously inter-bonded grains of a superhard material and attached on an end of the substrate, wherein a mean volume of the interstitial spaces is at least substantially uniform, the polycrystalline table further comprising:
        a cutting end comprising a first volume percentage of unaltered catalyst material used to catalyze inter-bonding of the grains of the superhard material;
        a substrate attachment end opposing the cutting end and comprising a second volume percentage of unaltered catalyst material used to catalyze inter-bonding of the grains of the superhard material, the second volume percentage of catalyst material being greater than the first volume percentage of catalyst material; and an intermediate region bonded to and interposed between the cutting end and the substrate attachment end and comprising a third volume percentage of unaltered catalyst material used to catalyze inter-bonding of the grains of the superhard material, the third volume percentage of catalyst material being smaller than the second volume percentage of catalyst material and greater than the first volume percentage of catalyst material.

13. The cutting element of claim 12, wherein the continuously inter-bonded grains of the superhard material comprise an at least substantially uniform mean grain size throughout the polycrystalline table.

14. The cutting element of claim 13, wherein the at least substantially uniform mean grain size comprises a mean grain size of about 2 microns to about 50 microns with a standard deviation of about 1 micron to 10 microns.

15. The cutting element of claim 12, wherein a grain size distribution of the continuously inter-bonded grains is multi-modal.

16. The cutting element of claim 12, wherein the first volume percentage of catalyst material decreases from a portion of the cutting end proximate the intermediate region to an opposing portion of the cutting end, the volume percentage of catalyst material proximate the opposing portion of the cutting end being at or near zero.

17. An intermediate structure during formation of a cutting element, comprising:
    a substrate;
    a polycrystalline table attached to an end of the substrate, the polycrystalline table comprising a plurality of inter-bonded grains of a superhard material and a catalyst material disposed in interstitial spaces between grains of the plurality of inter-bonded grains of a superhard material;
    a sacrificial layer of polycrystalline material bonded to the polycrystalline table at an end of the polycrystalline table opposing the substrate, the sacrificial layer of polycrystalline material comprising a plurality of inter-bonded grains of a superhard material and a catalyst material disposed in interstitial spaces between grains of the plurality of inter-bonded grains of a superhard material; and
    a sink disposed on an end of the sacrificial layer at an end of the sacrificial layer opposing the polycrystalline table, the sink comprising a material that reacts with the catalyst material at least at the reactivity level of a diamond powder.

18. The intermediate structure during formation of a cutting element of claim 17, wherein the sink comprises a material that reacts with the catalyst material above the reactivity level of a diamond powder.

19. A polycrystalline table formed by a process, comprising:
    providing a first layer comprising superhard particles having a first mean particle size on a layer of catalyst material;
    providing a second layer comprising superhard particles having a second mean particle size on the first layer, the second mean particle size being larger than the first mean particle size;
    providing a third layer comprising a reactive material on the second layer, the reactive material being reactive with the catalyst material;
    pressing and heating the first, second, and third layers;
    bonding particles of at least the first layer of superhard particles to form a polycrystalline material, wherein a mean volume of interstitial spaces between inter-bonded particles of the first layer is at least substantially uniform; and
    removing the second and third layers.

20. The polycrystalline table formed by a process of claim 19, further comprising:
    migrating a catalyst material through the interstitial spaces between particles of the first and second layers toward the third layer of reactive material.

21. The polycrystalline table formed by a process of claim 19, further comprising:
    attaching the polycrystalline material to a substrate.

22. The polycrystalline table formed by a process of claim 19, wherein providing a third layer comprising a reactive material on the second layer comprises providing a third layer comprising a reactive material selected from the group consisting of fine synthetic diamond, fine natural diamond, a combination of fine synthetic and fine natural diamond, and graphite on the second layer.

23. The polycrystalline table formed by a process of claim 19, wherein providing a first layer comprising superhard particles having a first mean particle size on a layer of catalyst material comprises providing a first layer comprising superhard particles having a mean particle size of about 2 microns to 50 microns.

24. The polycrystalline table formed by a process of claim 19, wherein providing a second layer comprising superhard particles having a second mean particle size on the first layer comprises providing a second layer comprising superhard particles having a mean particle size of about 100 microns to 500 microns on the first layer.

* * * * *

UNITED STATES PATENT AND TRADEMARK OFFICE
CERTIFICATE OF CORRECTION

| | | |
|---|---|---|
| PATENT NO. | : 8,475,918 B2 | Page 1 of 1 |
| APPLICATION NO. | : 12/916201 | |
| DATED | : July 2, 2013 | |
| INVENTOR(S) | : Anthony A. DiGiovanni et al. | |

It is certified that error appears in the above-identified patent and that said Letters Patent is hereby corrected as shown below:

On the title page:
In ITEM (75) Inventors:   change "Ennis (IE)" to --County Clare (IE)--

In ITEM (73) Assignees:   change "Claire (IE)" to --Clare (IE)--

In the specification:
    COLUMN 8,   LINE 4,   change "foaming" to --forming--
    COLUMN 13,  LINE 62,  change "powder 12 is" to --powder is--
    COLUMN 14,  LINE 47,  change "powder layer 12" to --powder 12--

Signed and Sealed this
Twenty-fourth Day of November, 2015

Michelle K. Lee
*Director of the United States Patent and Trademark Office*